J. W. V. MASON.
DOUGH KNEADING MACHINE.
APPLICATION FILED DEC. 10, 1912.
1,104,814.
Patented July 28, 1914.
4 SHEETS—SHEET 2.
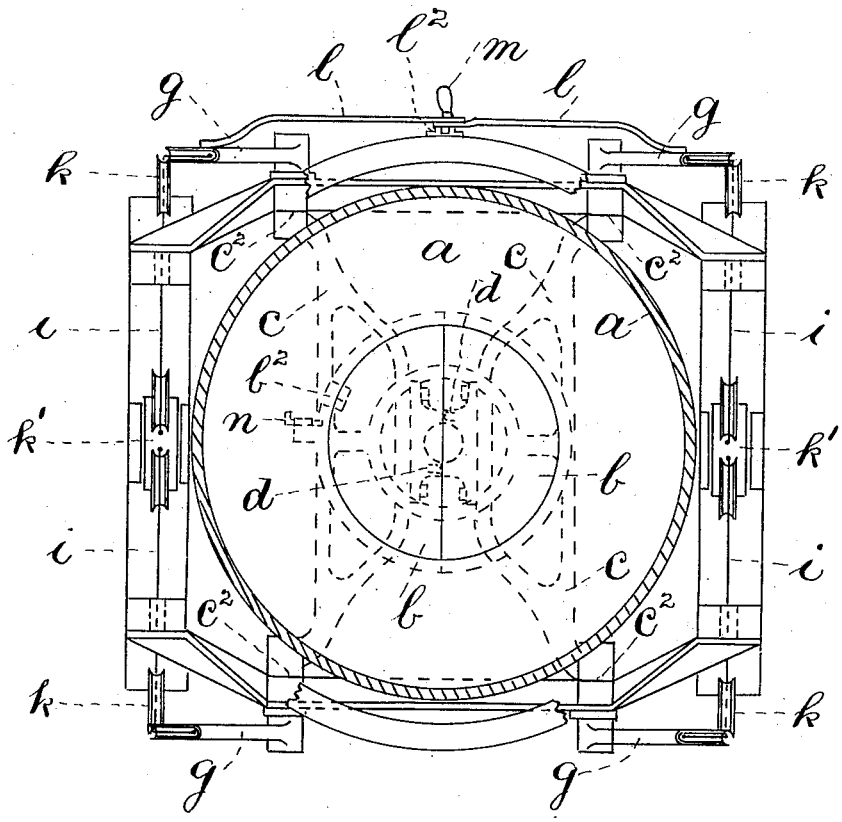
— FIG. 2 —

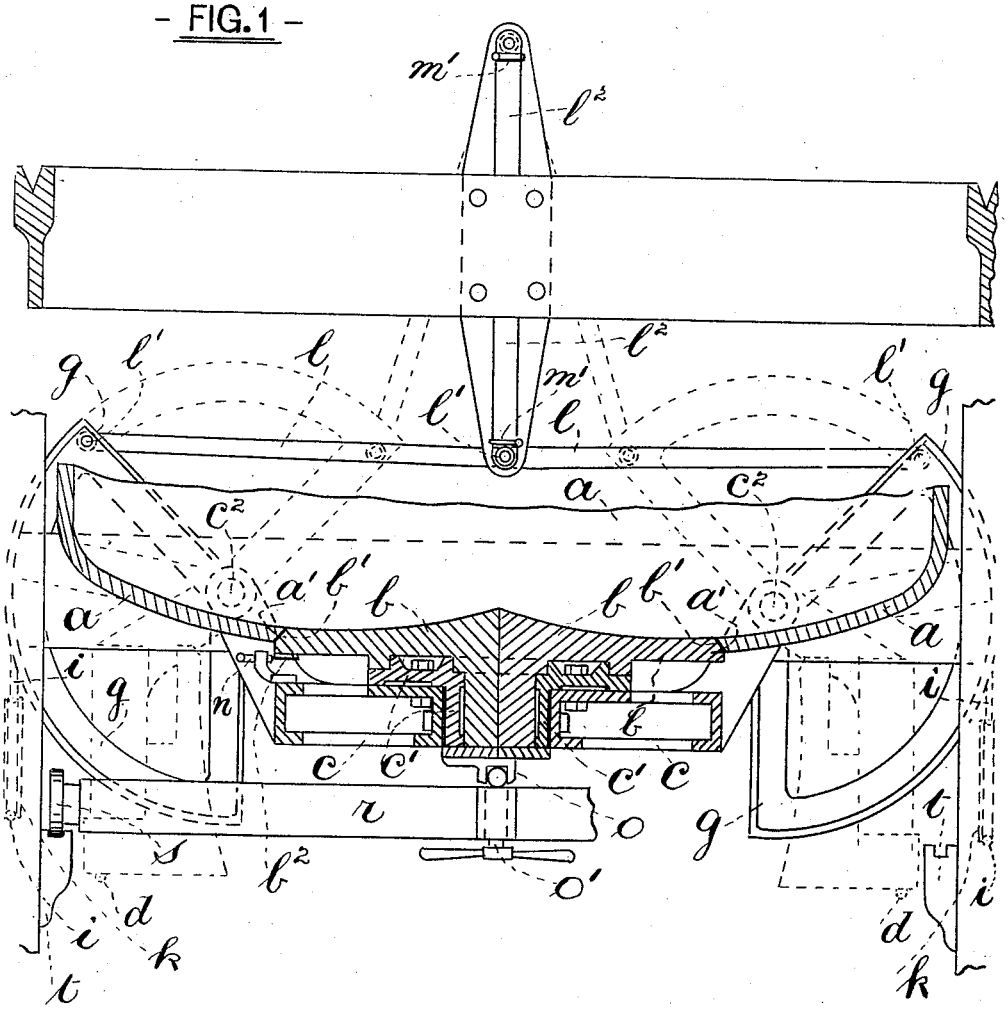

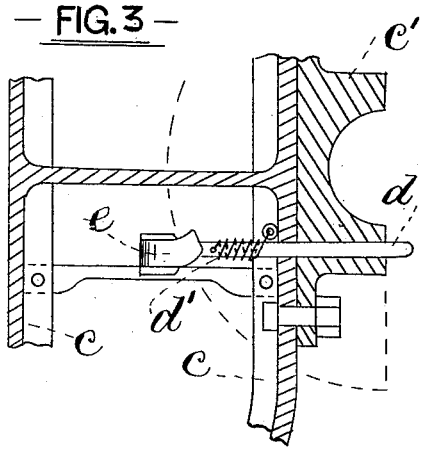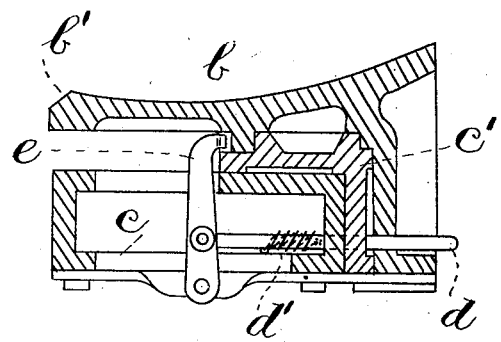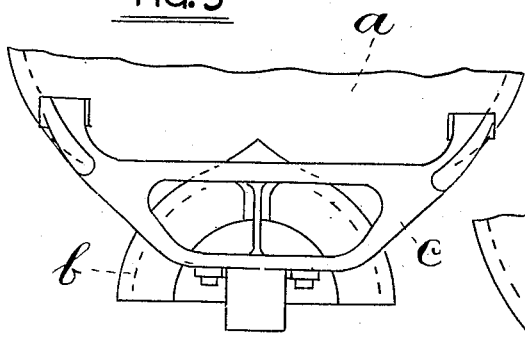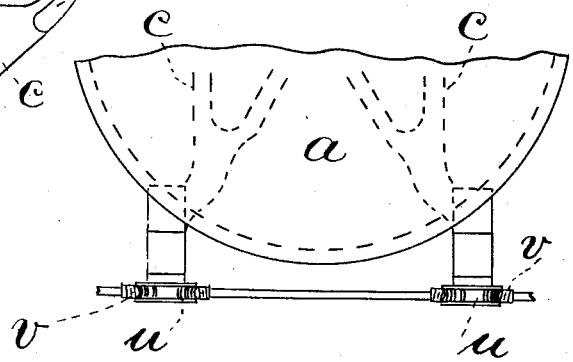

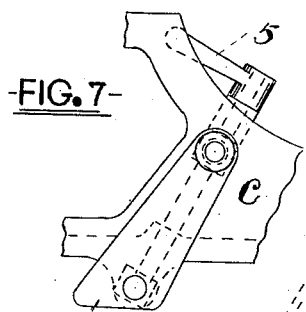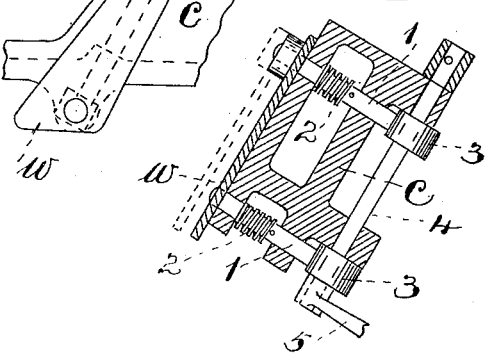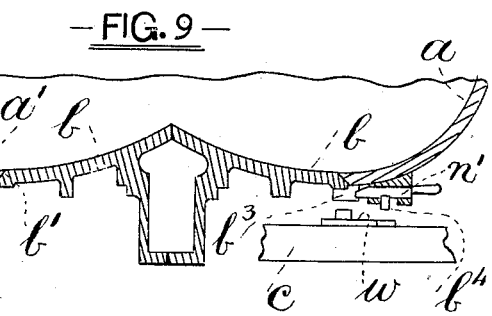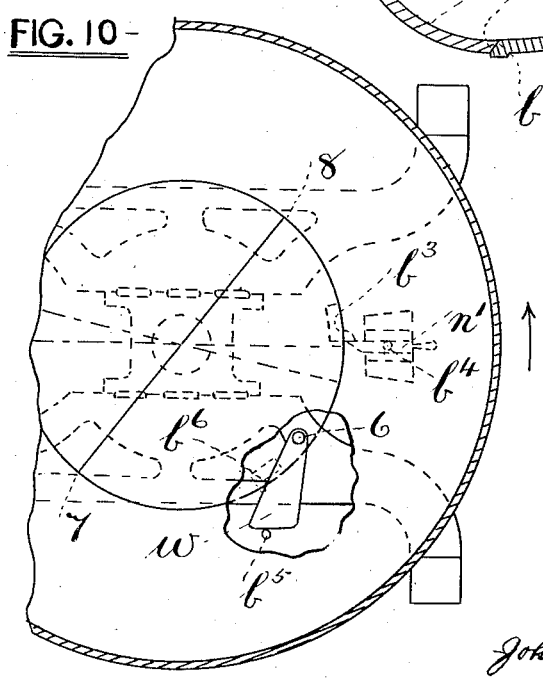

UNITED STATES PATENT OFFICE.

JOHN WILLIAM VICTOR MASON, OF MANCHESTER, ENGLAND.

DOUGH-KNEADING MACHINE.

1,104,814.   Specification of Letters Patent.   Patented July 28, 1914.

Application filed December 10, 1912. Serial No. 735,879.

*To all whom it may concern:*

Be it known that I, JOHN WILLIAM VICTOR MASON, a subject of the King of Great Britain, residing at Mona Works, Levenshulme, Manchester, England, have invented new and useful Improvements in Dough-Kneading Machines, of which the following is a specification.

The invention relates to the doors of dough kneading machines, and has for object the operation of the same as hereinafter described, whereby the pans to which such doors are connected may be more effectually and conveniently emptied and cleaned out of dough than heretofore.

In carrying out the invention, I provide the pan of the dough kneading machine with a door or doors which is or are revoluble or capable of movement within the hinge or upon the hinge or hinges supporting the same, thus enabling the door or doors to be opened or closed without having to stop the motion of said pan.

With reference to the drawings, Figure 1 is a sectional elevation of a portion of one form of apparatus according to my present invention, and in which part of a pan is indicated and mechanism for operating the doors of the same. Fig. 2 is a sectional plan view of the major portion of the apparatus, but on a smaller scale. Figs. 3 and 4 show, on an enlarged scale, details of the apparatus, said Fig. 3 being a sectional plan view of part of a door hinge, and said Fig. 4 a sectional elevation thereof showing a half door mounted thereon. Fig. 5 is a front view, again on a reduced scale, of a hinge and opened door portion of apparatus assumed to be applied to a dough kneading pan. Fig. 6 is a plan view showing application of a modified form of means for moving said hinge or hinges for a pair of half doors. Fig. 7 is an enlarged view of part of a door hinge having applied thereto a modification relating to means for providing a positive drive of the pan door, and Fig. 8 is a view at right angles therewith. Fig. 9 shows a sectional elevation of part of a pan and door parts connected therewith, with details having reference to the positive drive aforesaid. Fig. 10 is a broken sectional plan view of part of Fig. 9 with certain details added thereto.

$a$ is the pan and $b$ is the door part thereof. In the present examples the door is made to consist of two halves, but with the use of a single door, the same being circular, it is obvious that the means hereinafter described for insuring the door parts being in the correct positions for opening would not be necessary, since a complete circular door could open at any part arranged.

Each of the parts $b$ is in connection with a fixed hinge $c$, one portion $c^1$ of which forms a bearing for said part $b$. When the door is shut the parts referred to can be arranged to partake of the rotary movement of the pan, or turn within said hinge or bearing $c^1$. The pan and part doors are provided with contact surfaces $a^1$, $b^1$, respectively. Tight contact at the said surfaces may be utilized to enable the motion of the pan to be transmitted to the door parts named. The hinges are pivoted at $c^2$, and means are provided for preventing the relative positions of a hinge $c$ and door part $b$ being disturbed, or for preventing the latter falling out of position for correct closing after the pan has been opened, which means here consist of a rod $d$ passing through $c$ and $c^1$ on one side of the door pivot (Figs. 2, 3, and 4), held normally in the extended position by attached spring $d^1$ and capable of operating a pivoted lever $e$ connected to the hinge $c$. Under the action of the spring $d^1$ the claw end of the lever $e$ engages a slot in the door part $b$ (Fig. 4) thus preventing the rotation of the latter while the door is open, or the surfaces $a^1$, $b^1$, disengaged. It will be seen, however, that as the parts of the door come together for closing the pan, the surface of the half door in Fig. 1 will impinge against the end of the rod $d$ projecting from the opposing half door, and so eventually force the claw of the lever $e$ out of engagement with the slot before named. This is arranged to finally take place as the door closes, thus releasing the latter for the purpose named. A rod and mechanism relating thereto are provided for each half door and hinge, but on opposite sides of the axial parts of the former.

The hinges $c$, $c$, are operated in the present examples by and connected to quadrant-like or bell crank arms $g$, (Figs. 1 and 2) provided with cords or flexible connections $i$ passing around pulleys $k$, and preferably so arranged as to lead to centrally situated weights $k^1$ for facilitating the closing of the doors, (Fig. 2). The said quadrants or the like, are shown operated by links $l$ pivoted at $l^1$, and working in a suitable slide $l^2$ which slide is here shown upon a rim or bearing upon which the pan is supported and moves, as is well understood.

In Fig. 1 the position of the mechanism when the doors are opened is indicated by broken lines. In Fig. 2 the said links $l$ are to be operated by handle $m$, and any suitable form of stop, such as spring clips $m^1$ may be employed for temporarily retaining the links at the extreme positions. To insure the doors being in the correct positions relatively to the hinges, for opening purposes, a projection $b^2$ is shown upon one of the doors which projection is capable of engaging a bolt $n$ working in a socket upon the hinge. When this bolt is pushed inward, and the projection $b^2$ comes in contact therewith, rotation of the half doors is prevented, and the latter may skid, so to speak, at the surfaces of contact $a^1$, $b^1$. During the dough kneading operation, the halves of the door are shown supported by additional means such as the part $o$, provided, by preference, with ball bearings, which bearings are in connection with a screw device $o^1$ for regulating the degree of contact with the lower parts of the door as is well understood. The device is carried by a bearer or beam $r$ upon wheels $s$ capable of running on rails $t$. The said bearer may be run out of the way on the rails $t$, and thus remove the support named when the opening of the pan is desired.

Fig. 6 shows a modification as an example for operating the hinges $c$, $c$, wherein worm wheels $u$ on the pivots of said hinges are operated by worms $v$ upon a shaft which may be driven when desired. When it is desired to give a positive drive to the door parts of the door, instead of relying upon contact between the surfaces $a^1$, $b^1$, the means illustrated in Figs. 7 to 10 may be employed in substitution for the bolt and projection device, $n$ and $b^2$, already described. That is to say, a bolt $n^1$ is supported in a socket piece attached to the pan itself, and is capable of being slid into the path of a projection $b^3$ attached to the door part $b$, thus insuring the latter being driven directly by the pan. In order to automatically cause the bolt $n^1$ to be disconnected from the said projection, the said bolt is formed with a lug $b^4$ which is capable of coming in contact with the wedge shaped plate $w$ when the latter is raised so as to intercept said projection. This plate is supported by spindles 1 under the control of springs 2 (Fig. 8), in connection with the hinge part $c$, said spindles being actuated by eccentrics 3 operated by shaft 4 and handles 5.

In Fig. 10 the pan is assumed to be rotating in the direction indicated by the external arrow line, when it will be seen that on the bolt $n^1$ being pushed inward to the position indicated, the same will drive the door part $b$ through the projection $b^3$. When however the bolt and projection reach the position of the plate $w$, or the protuberance $b^4$ reaches the position $b^5$, and the projection $b^3$ reaches the position $b^6$, then if the plate has previously been raised, protuberance $b^4$ will make contact therewith and the bolt be withdrawn as the pan continues to rotate, while the projection $b^3$ will about this time of withdrawal come in contact with the projection 6 on said plate $w$ with the result that the door part will be retained in the correct position for opening. The line 7, 8, indicates the position of the dividing line between the two half doors relatively to the positions of the bolt $n^1$ and projection $b^3$; the similar line in an oblique direction, and broken, shows the said dividing line at the moment the first contact with the plate $w$ described, takes place, and the similar broken line in the horizontal direction gives the position of the same for opening purposes.

I claim:—

1. In means for operating the doors of the rotatable pans of dough kneading machines, a hinge mounted and operated external to the pan, and having a relatively rotatable door part mounted thereon, and arresting means for stopping the said door part at a predetermined position relatively to said hinge for enabling the pan to be opened without interfering with its motion, substantially as herein set forth.

2. In means for operating the doors of the rotatable pans of dough kneading machines, a hinge mounted and operated external to the pan, and having a relatively rotatable door part mounted thereon, movement arresting means for stopping the said door part at a predetermined position relatively to said hinge and retaining means for keeping the relative positions of hinge and door undisturbed, while the latter is open, substantially as herein set forth.

3. In means for operating the doors of the rotatable pans of dough kneading machines, a hinge mounted and operated external to the pan, and having a relatively rotatable door part mounted thereon, a bolt and projection device for arresting the movement of said door part, a spring bolt device for retaining the door part and hinge in the desired relative positions, while the pan is open, and means for moving said hinge for the purpose of opening said pan, substantially as herein set forth.

In testimony whereof I have signed my name to this specification in the presence of two subscribing witnesses.

JOHN WILLIAM VICTOR MASON.

Witnesses:
 ARTHUR GADD,
 GEORGE FREDERICK GADD.

Copies of this patent may be obtained for five cents each, by addressing the "Commissioner of Patents, Washington, D. C."